United States Patent
Matsubaguchi et al.

(10) Patent No.: US 6,913,818 B2
(45) Date of Patent: Jul. 5, 2005

(54) MAGNETIC RECORDING MEDIUM

(75) Inventors: Satoshi Matsubaguchi, Kanagawa (JP); Hiroaki Takano, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/860,586

(22) Filed: Jun. 4, 2004

(65) Prior Publication Data

US 2004/0247944 A1 Dec. 9, 2004

(30) Foreign Application Priority Data

Jun. 6, 2003  (JP) ........................................ 2003-162402

(51) Int. Cl.$^7$ .......................... G11B 5/706; G11B 5/702
(52) U.S. Cl. .................... 428/323; 428/328; 428/425.9; 428/694 BU; 428/694 BA
(58) Field of Search ................................ 428/323, 328, 428/425.9, 694 BU, 694 BA

(56) References Cited

U.S. PATENT DOCUMENTS

| 5,835,673 A | * | 11/1998 | Yamada et al. ............. 386/112 |
| 5,906,880 A | * | 5/1999 | Chiba et al. ................. 428/141 |
| 6,753,084 B2 | * | 6/2004 | Maekawa et al. ........... 428/402 |
| 2001/0044037 A1 | * | 11/2001 | Naoe et al. ........... 428/694 BS |

FOREIGN PATENT DOCUMENTS

| JP | 2001-325716 A | 11/2001 |
| JP | 2002-157726 A | 5/2002 |

* cited by examiner

Primary Examiner—Stevan A. Resan
(74) Attorney, Agent, or Firm—Sughrue Mion, PLLC

(57) ABSTRACT

A magnetic recording medium comprising a non-magnetic support and a magnetic layer containing a binder and a ferromagnetic metal powder dispersed in the binder, wherein the binder contains a polyurethane resin obtained from a polyester polyol, a chain extender, and an organic diisocyanate, and the magnetic layer has a product Π of coercive force Hc (kA/m) in an in-plane, longitudinal direction and magnetic flux Øm (T$\mu$m) in a range of from 400 to 800.

15 Claims, No Drawings

MAGNETIC RECORDING MEDIUM

FIELD OF THE INVENTION

This invention relates to a magnetic recording medium comprising a non-magnetic support having provided thereon a magnetic layer containing a ferromagnetic fine powder dispersed in a binder. More particularly, it relates to a particulate magnetic recording medium suitable for magnetoresistive (MR) head reading and excellent in electromagnetic conversion.

BACKGROUND OF THE INVENTION

Magnetic recording media are widely used in various formats such as audio tapes, video tapes, and floppy disks. A magnetic recording medium has a non-magnetic support on which is provided a magnetic layer having ferromagnetic powder dispersed in a binder.

A magnetic recording medium is required to satisfy high criteria of various characteristics including electromagnetic conversion, running durability, and running performance. In the recent data media applications where large capacity, high speed and high reliability are demanded, there is a fear that an MR head having a thin metal film undergoes deterioration of performance due to corrosion. It has been a subject to settle this problem.

As stated, not only excellent electromagnetic conversion characteristics but satisfactory running durability are required of a magnetic recording medium. To secure satisfactory running durability, an abrasive and a lubricant are usually incorporated into the magnetic layer.

To satisfy both the requirements of electromagnetic conversion and running durability, limitations of the size and number of abrasive particles to be used in the magnetic layer are proposed as in JP-A-2002-157726. An abrasive should be used in a substantial quantity in order to achieve substantial improvement on running durability, which results in, of necessity, a decrease of the proportion of the ferromagnetic powder. When an abrasive having a relatively large particle size is employed for obtaining excellent running durability, the abrasive particles are apt to project excessively from the magnetic layer surface. In other words, improvement on running durability by an abrasive can cause deterioration of the electromagnetic conversion characteristics.

In order to satisfy both electromagnetic conversion characteristics and running durability, it has been proposed to reduce the particle size of a magnetic substance and to optimize the amount of a lubricant as disclosed, e.g., in JP-A-2001-325716. A lubricant, when used for the purpose of improving running durability, must be added in an increased amount. It would follow that the binder is easily plasticized, which can result in reduced durability of the magnetic layer.

The binder, one of the main components of the magnetic layer, also plays an important roll in improving running durability and electromagnetic conversion characteristics, as will be appreciated from the following. It is known that a non-magnetic layer can be provided between a support and a magnetic layer so as to allow thinning of the magnetic layer. A magnetic recording medium with a still thinner magnetic layer and still finer ferromagnetic metal particles has been demanded. A finer ferromagnetic metal powder is less dispersible, and poor dispersibility results in deterioration of magnetic layer's surface properties and electromagnetic conversion characteristics and makes it difficult to assure durability.

That is, it is desirable for the binder resin used in such an improved magnetic recording medium to have high dispersing capabilities for ferromagnetic metal powder and non-magnetic powder and excellent durability based on hardness (i.e., high Tg and high Young's modulus) and toughness (or elongation).

Metal evaporated (ME) tape having a ferromagnetic metal thin film formed by vacuum evaporation has been put to practical use as video tape fit for digital video cassettes (DVCs) of consumer VCRs (SD format). Because metal particulate (MP) tape, whose magnetic layer is formed by applying a ferromagnetic metal powder dispersion, is superior to ME tape in durability and economy, it could be very useful in application to consumer DVCs. However, it has hardly been expected of MP tape to exhibit sufficiently stable electromagnetic conversion performance, especially overwrite capabilities, even when prepared using a binder resin having the above-described excellent properties.

It is conceivable means to decrease coercive force Hc and thickness of the magnetic layer in order to improve overwrite. That means, if adopted alone, results in reduction of saturated magnetic flux density Øm of the magnetic layer and reduction of read output. That is, in order to improve overwrite without inviting read output reduction, it is necessary to increase the packing density of magnetic particles in the magnetic layer by reducing the magnetic layer thickness or to raise the saturated magnetic flux density Øm of the magnetic layer by, for example, using a magnetic substance with high saturation magnetization σs. The problem confronting is that magnetic particles with increased σs are disturbed in magnetic orientation due to their magnetostatic interaction, which results in reduced output. A condition under which satisfactory read output and improved overwrite can be obtained stably has not been found as yet.

A magnetoresistive (MR) head provides a few times as much output as an inductive head. Having no inductive coil, an MR head achieves great reduction of noise created by equipment, such as impedance noise. Therefore, an MR head, being promising for improvement on high-density recording reproduction, has been steadily extending its application. Compared with a metal-in-gap (MIG) head that provides output signals in accordance with the saturated magnetic flux density Øm, an MR head has an advantage of high sensitivity. However, if an MR head is saturated, it fails to give satisfactory output only to have poor electromagnetic conversion performance.

Thus, the present inventors have extensively studied for obtaining excellent electromagnetic conversion in a read system using an MR head.

SUMMARY OF THE INVENTION

An object of the present invention is to provide a magnetic recording medium suitable for MR head reading which has excellent electromagnetic conversion characteristics such as read output and overwrite performance.

The present inventors have extensively studied for a magnetic recording medium with excellent electromagnetic conversion characteristics such as read output and overwrite performance. They have found as a result that the above-mentioned outstanding problems can be settled by specifying magnetic characteristics of the magnetic layer.

The present invention provides a magnetic recording medium having a non-magnetic support and a magnetic layer having a ferromagnetic metal powder dispersed in a binder. The binder contains a polyurethane resin obtained from a polyester polyol, a chain extender, and an organic diisocyanate, and the magnetic layer has such magnetostatic energy that the product Π of coercive force Hc (kA/m) in the in-plane, longitudinal direction and magnetic flux Øm (T$\mu$m) ranges from 400 to 800.

In a preferred embodiment of the present invention,
(a) the polyurethane is (1) one in which the polyester polyol component contains an aliphatic dibasic acid component and 70 mol % or more, based on the total diol component content, of an alkyl-branched diol component having no cyclic structure and having an alkyl branch containing more than one carbon atoms or (2) one in which the polyester polyol component contains an aliphatic dibasic acid component, 70 mol % or more, based on the total diol component content, of an aliphatic alkyl-branched diol component having at least one alkyl branch containing more than one carbon atoms in total per molecule, and, as a chain extender, an aliphatic alkyl-branched diol having at least one alkyl branch containing more than two carbon atoms in total per molecule; or
(b) the ferromagnetic metal powder has a BET specific surface area $S_{BET}$ of 50 to 90 m²/g and a saturation magnetization as of 90 to 130 A·m²/kg.

With the product Π of coercive force Hc (kA/m) in the in-plane, longitudinal direction and magnetic flux Øm (T$\mu$m) of the magnetic layer being specified as a measure of magnetostatic energy of the layer, the magnetic recording medium according to the invention achieves a balance between read output and overwrite. In application to a recording system with an MR head, the magnetic recording medium of the invention is equal to ME tape in overwrite performance, provides high read output, and produces reduced noise.

DETAILED DESCRIPTION OF THE INVENTION

The magnetic recording medium of the present invention comprises a non-magnetic support and a magnetic layer (hereinafter sometimes referred to as an upper layer) provided on one side of the support. It can additionally have a non-magnetic layer (hereinafter sometimes referred to as a lower layer) between the non-magnetic support and the magnetic layer and a backcoating layer on the other side of the support according to necessity.

The magnetic layer of the magnetic recording medium of the invention satisfies the following relationship:

$$\Pi = Hc \times \text{Øm} = 400 \text{ to } 800$$

where Hc is a coercive force (unit: kA/m) in the in-plane, longitudinal direction of the magnetic layer; and Øm is a magnetic flux (unit: T$\mu$m) per unit area of the magnetic layer.

Π is from 400 to 800, preferably 480 to 720, more preferably 480 to 640. If Π is smaller than 400, the read output, particularly in the long wavelength region, is low. If it is greater than 800, the overwrite performance is poor.

Means for obtaining the specific Π include, but are not limited to, (i) using a ferromagnetic metal powder having a given specific surface area as measured by the BET method ($S_{BET}$) and a given saturation magnetization as, (ii) controlling the thickness of the magnetic layer, and (iii) using a polyurethane resin having a specific structure as a binder resin.

The ferromagnetic metal powder that can be used in the present invention preferably has a BET specific surface area $S_{BET}$ of 50 m²/g or more and less than 90 m²/g, still preferably 60 to 80 m²/g, particularly preferably 65 to 75 m²/g. An $S_{BET}$ less than 50 m²/g results in increased noise. Ferromagnetic metal powder with an $S_{BET}$ more than 90 m²/g tends to agglomerate due to poor dispersibility, which results in formation of a magnetic layer with poor surface properties.

The ferromagnetic powder preferably has a saturation magnetization σs of 90 to 130 A·m²/kg, still preferably 100 to 120 A·m²/kg, particularly preferably 100 to 110 A·m²/kg (emu/g). A σs less than 90 A·m²/kg results in insufficient magnetostatic energy. A σs exceeding 130 A·m²/kg invites saturation of the MR head, which results in deterioration of electromagnetic conversion characteristics.

The binder that can be used in the present invention comprises a polyurethane resin prepared from a polyester polyol, a chain extender, and an organic diisocyanate. The polyurethane resin is preferably (1) one prepared from a polyester polyol in which the dibasic acid component contains an aliphatic dibasic acid component, and 70 mol % or more of the total diol component is a diol free from a cyclic structure and having an alkyl branch containing more than one carbon atoms or (2) one prepared from (2-1) a polyester polyol in which the dibasic acid component contains an aliphatic dibasic acid component, and 70 mol % or more of the total diol component is an alkyl-branched aliphatic diol having at least one alkyl branch containing more than one carbon atoms in total per molecule and (2-2) a chain extender containing an alkyl-branched aliphatic diol having at least one alkyl branch containing more than two carbon atoms in total per molecule in the magnetic layer and/or the lower layer, if provided.

The above-described polyurethanes contain, in their polyol component, no cyclic structure (e.g., an aromatic ring or a cyclohexane ring) that might adversely affect solvent solubility. Because of the absence of such a cyclic structure and the presence of a side branch in the diol component, steric hindrance occurs to prevent association between urethane bonds or ester bonds thereby to lessen the intermolecular action. As a result, these polyurethane resins exhibit excellent solvent solubility. When used in the magnetic layer, in particular, the binder containing the polyurethane exhibits excellent dispersing capability for magnetic powder, which is liable to agglomeration through magnetic energy, to provide a magnetic layer with improved surface smoothness.

The polyurethane that is used in the present invention is obtained from a polyester polyol, a chain extender, and an organic diisocyanate. The polyester polyol includes (1) one comprising an aliphatic dibasic acid component and a diol component, 70 mol % or more of the diol component being free from a cyclic structure and having an alkyl side branch containing two or more carbon atoms and (2) one comprising an aliphatic dibasic acid component and a diol component, 70 mol % or more of the diol component being an alkyl-branched aliphatic diol component having one or more alkyl branches containing two or more carbon atoms in total per molecule.

A polyurethane resin having at least a component derived from the polyester polyol (1) will hereinafter be referred to as polyurethane (1). A polyurethane resin comprising a component derived from the polyester polyol (2) and a component derived from an alkyl-branched aliphatic diol having one or more alkyl branches containing three or more carbon atoms in total per molecule as a chain extender will be referred to as polyurethane (2). The binder that can be used in the magnetic layer and/or the lower layer (if provided) contains polyurethane (1) and/or polyurethane (2).

A diol having an alkyl side branch containing two or more carbon atoms and having no cyclic structure which provides the diol component of the polyester polyol (1) will be referred to as diol A. The diol A should have at least one alkyl branch containing more than one carbon atoms. The diol A may have a methyl group or others, such as a halogen atom or an alkoxy group, as a branch. The alkyl branch preferably contains 2 to 4 carbon atoms. The diol A preferably has one or two branches. The diol A preferably contains 3 to 6 carbon atoms in its main chain. The diol A component should be present in the polyester polyol (1) in a proportion of at least 70 mol %, preferably 80 to 100 mol %, based on the total diol component content. The other diol components the polyester polyol (1) may have include those derived from straight chain diols containing 2 to 9 carbon atoms and those derived from cyclic diols containing 6 to 24 carbon atoms.

A diol having at least one alkyl branch and containing two or more carbon atoms in total in the alkyl branch or branches per molecule which provides the alkyl-branched aliphatic diol component of the polyester polyol (2) will be referred to as diol B. The diol B should have at least two carbon atoms in total in its alkyl branch. This does not always mean that the diol B must not have a side branch other than an alkyl group. If desired, the diol B may carry a cyclic structure (e.g., an alicyclic group), a halogen atom, an alkoxy group, etc. as a branch. The alkyl branch of the diol B is preferably a methyl group. The diol B preferably has two or three methyl groups as branches. The diol B preferably contains 3 to 6 carbon atoms in its main chain. The diol B component should be present in the polyester polyol (2) in a proportion of at least 70 mol %, preferably 80 to 100 mol %, based on the total diol component content. The other diol components the polyester polyol (2) may have include those derived from straight chain diols containing 2 to 9 carbon atoms and those derived from cyclic diols containing 6 to 24 carbon atoms.

The alkyl-branched aliphatic diol containing more than two carbon atoms in total in its branch or branches per molecule, which can be used as a chain extender of the polyurethane (2), will be referred to as diol C. The diol C should have at least three carbon atoms in total in its alkyl branch or branches. This does not always mean that the diol C must not have a side branch other than an alkyl group. Similarly to the diol B, the diol C may bear a cyclic structure (e.g., an alicyclic group), a halogen atom, an alkoxy group, etc. as a branch according to necessity. The alkyl branch of the diol C preferably includes an ethyl group, a propyl group, and a butyl group. The diol C preferably has two or three such alkyl branches. The diol C preferably contains 3 to 6 carbon atoms in its main chain.

Examples of the diol A or diol B are 2,2-dimethyl-1,3-propanediol, 3,3-dimethyl-1,5-pentanediol, 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentanediol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-ethyl-1,6-hexanediol, 2-propyl-1,6-hexanediol, 2-butyl-1,6-hexanediol, 5-ethyl-1,9-nonanediol, 5-propyl-1,9-nonanediol, and 5-butyl-1,9-nonanediol.

Among them preferred as a diol A are 2-ethyl-1,3-hexanediol, 2-butyl-1,3-propanediol, and 2,2-diethyl-1,3-propanediol. Preferred as a diol B are 2,2-dimethyl-1,3-propanediol and 3,3-dimethyl-1,5-pentanediol.

Examples of the diol C include 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-propyl-1,6-hexanediol, 2-butyl-1,6-hexanediol, 5-propyl-1,9-nonanediol, and 5-butyl-1,9-nonanediol. Preferred of them are 2-ethyl-2-butyl-1,3-propanediol and 2,2-diethyl-1,3-propanediol.

The aliphatic dibasic acids that can be used to prepare the polyester polyol preferably include those having 4 to 10 carbon atoms. The term "aliphatic" in the aliphatic dibasic acids means having an acyclic structure. The aliphatic dibasic acids may contain a hetero atom, e.g., oxygen or sulfur, in their main chain. Examples of the aliphatic dibasic acids are succinic acid, adipic acid, azelaic acid, sebacic acid, malonic acid, glutaric acid, pimelic acid, and suberic acid, with succinic acid, adipic acid, and sebacic acid being preferred.

The aliphatic dibasic acid component is preferably present in the polyester polyol in a proportion of at least 70 mol %, still preferably 80 to 100 mol %, based on the total dibasic acid component content. With the aliphatic dibasic acid component content being 70 mol % or higher (i.e., with a minor content of dibasic acid components with a cyclic structure, such as aromatic dibasic acid components), the polyurethane resin has improved solvent solubility to exhibit satisfactory dispersing capability for powder.

The organic diisocyanates providing a constituent component of the polyurethanes (1) and (2) include aromatic diisocyanates, such as 2,4-tolylene diisocyanate, 2,6-tolylene diisocyanate, xylylene 1,4-diisocyanate, xylylene 1,3-diisocyanate, 4,4'-diphenylmethane diisocyanate, 4,4'-diphenyl ether diisocyanate, 2-nitrodiphenyl 4,4'-diisocyanate, 2,2'-diphenylpropane 4,4'-diisocyanate, 4,4'-diphenylpropane diisocyanate, m-phenylene diisocyanate, p-phenylene diisocyanate, naphthalene 1,4-diisocyanate, naphthalene 1,5-diisocyanate, and 3,3'-dimethoxydiphenyl 4,4'-diisocyanate; aliphatic diisocyanates, such as tetramethylene diisocyanate, hexamethylene diisocyanate, and lysine diisocyanate; and alicyclic diisocyanates, such as isophorone diisocyanate, hydrogenated tolylene diisocyanate, and hydrogenated diphenylmethane diisocyanate. The aromatic diisocyanates are preferred. 4,4'-Diphenylmethane diisocyanate, 2,2-tolylene diisocyanate, p-phenylene diisocyanate, and isophorone diisocyanate are still preferred.

The polyurethane preferably has a weight average molecular weight (Mw) of 30,000 to 70,000, still preferably 40,000 to 60,000. The polyurethane having an Mw of 30,000 or more provides a coating film with high strength and satisfactory durability. The polyurethane having an Mw of 70,000 or less exhibits high solubility in a solvent and satisfactory dispersing capability for powder.

The polyurethane preferably has a glass transition temperature (Tg) of 500 to 150° C., still preferably 70° to 120° C., particularly preferably 80 to 100° C. The polyurethane having a Tg of 50° C. or higher forms a coating film with high strength in high temperature thereby providing a magnetic recording medium excellent in durability and storage stability. The polyurethane having a Tg of 150° C. or lower forms a coating film having high calender ability to provide a magnetic recording medium with improved electromagnetic conversion characteristics.

The polyurethanes (1) and (2) preferably have a polar group. The polar group is selected from —$SO_3M$, —$OSO_3M$, —COOM, —P=$O(OM)_2$, —O—P=$O(OM)_2$, —$NR_2$, —$N^+R_2R'COO^-$ (wherein M represents a hydrogen atom, an alkali metal atom or an ammonium group; and R and R' each represent an alkyl group having 1 to 12 carbon atoms). Preferred of the enumerated polar groups are —$SO_3M$, —$OSO_3M$, —P=$O(OM)_2$, and —COOM. Still preferred are —$SO_3M$ and —$OSO_3M$. A preferred polar group content is from $1\times10^{-5}$ eq/g to $2\times10^{-4}$ eq/g. The polyurethane having a polar group content of $1\times10^{-5}$ eq/g or more tends to have strong adsorptivity for magnetic powder to exhibit improved dispersing capability. The polyurethane having a polar group content of $2\times10^{-4}$ eq/g or less tends to have high solubility in a solvent to exhibit improved dispersing capability.

The polyurethane (1) or (2) having a polar group can be obtained by using a polar group-containing monomer as a diol component or a dibasic acid component of the above-described polyester polyol (1) or (2) or as a polyol component other than the polyester polyol (1) or (2) in the preparation of the polyurethane (1) or (2). Otherwise, a polar group may be introduced into a separately prepared polyurethane (1) or (2).

The polyol component that can be used in combination includes polyester polyols, polyether polyols, polyether ester polyols, and polycarbonate polyols. The polar group-containing monomers include sodium 5-sulfoisophthalate, potassium 5-sulfoisophthalate, sodium sulfoterephthalate, potassium terephthalate, 2-sulfo-1,4-butanediol sodium salt, 2-sulfo-1,4-butanediol potassium salt, sodium bis(2-hydroxyethyl)phosphinate, dimethylolpropionic acid, sodium dimethylolpropionate, sodium sulfosuccinate; polar group-containing polyester polyols obtained by dehydrating condensation with other glycols or dicarboxylic acids; polar group-containing polyester polyols obtained by ring opening polymerization of lactones (e.g., $\epsilon$-lactone) using the above-described polar group-containing diol as an initiator; and polar group-containing polyether diols obtained by adding an alkylene oxide (e.g., ethylene oxide or propylene oxide) to the polar group-containing diols.

The urethane group content in the polyurethanes (1) and (2) is preferably 3.0 to 4.0 mmol/g, still preferably 3.3 to 3.7 mmol/g. The polyurethane having a urethane group content of 3.0 mmol/g or higher provides a coating film with a high Tg and good durability. With a urethane group content of 4.0 mmol/g or lower, the polyurethane has high solvent solubility to exhibit improved dispersing capability. Polyurethane having a urethane group content exceeding 4.0 mmol/g necessarily lacks a polyol component. Synthesis of such polyurethane is liable to be accompanied with inconveniences, such as difficulty of molecular weight control.

The hydroxyl group content (the number of hydroxyl groups per molecule) of the polyurethanes (1) and (2) is preferably 3 to 20, still preferably 3 to 15, per molecule. The polyurethane having at least three hydroxyl groups per molecule has sufficient reactivity with an isocyanate curing agent to provide a coating film with improved strength and excellent durability. The number of hydroxyl groups per molecule being 5 or fewer, the polyurethane has high solvent solubility to exhibit satisfactory dispersing properties.

The polyurethanes (1) and (2) are a component of binders used in the lower layer and/or the upper magnetic layer. The binder that can be used in the lower layer and/or the upper magnetic layer may be composed solely of the polyurethane (1) and/or (2) or may be a mixed binder of the polyurethane (1) and/or (2) and other binder resins. Usually, a composition containing a curing agent, such as a polyisocyanate, in addition to the resin component(s) is used as a binder.

The other binder resins that can be used in combination with the polyurethane (1) or (2) include vinyl chloride resins, preferably those having a degree of polymerization of 100 to 500, still preferably 150 to 400, particularly preferably 200 to 300. The vinyl chloride resins include vinyl chloride homopolymers and copolymers obtained by copolymerizing vinyl chloride with other vinyl monomers, such as vinyl acetate, vinyl alcohol, vinylidene chloride, and acrylonitrile.

A copolymer comprising a vinyl chloride unit and a vinyl acetate unit is a preferred vinyl chloride resin. In particular, a vinyl chloride-vinyl acetate copolymer having a vinyl acetate unit content of 1 to 15% by weight has high compatibility with the polyurethanes (1) and (2). Besides, a coating composition containing such a vinyl chloride-vinyl acetate copolymer in combination with the polyurethanes (1) or (2) shows a reduced viscosity at a high shear rate and thereby forms a magnetic layer with an extremely smooth surface.

It is desirable for the vinyl chloride resin to have the same or similar polar group as the polyurethanes (1) and (2) used in combination. A preferred polar group content of the vinyl chloride resin is $1\times10^{-5}$ to $1\times10^{-3}$ eq/g, within which range a coating composition has a moderate viscosity and satisfactory dispersing capability. The vinyl chloride resin preferably has an epoxy group. A preferred epoxy group content is $1\times10^{-4}$ to $1\times10^{-2}$ eq/g, still preferably $5\times10^{-4}$ to $2\times10^{-3}$ eq/g.

It is also desirable for the vinyl chloride resin to have a hydroxyl group. The hydroxyl-containing vinyl chloride resin reacts with an isocyanate curing agent to form a crosslinked structure, which imparts mechanical strength to the coating film. The vinyl chloride resin having a hydroxyl group introduced to the main chain via a hydrocarbon chain or a polyalkylene glycol chain is preferred for higher curability than the one having a hydroxyl group directly introduced to the main chain like a vinyl alcohol hydroxyl group. The hydroxyl group is preferably secondary or primary. The hydroxyl-containing vinyl chloride resin can be obtained by using, as a comonomer, a hydroxyl-containing vinyl compound, such as 2-hydroxypropyl(meth)acrylate, 3-hydroxypropyl (meth)acrylate, 4-hydroxybutyl(meth) acrylate or 4-hydroxybutyl allyl ether. The hydroxyl content of the vinyl chloride resin is preferably $1\times10^{-4}$ to $5\times10^{-3}$ eq/g, still preferably $2\times10^{-4}$ to $2\times10^{-3}$ eq/g.

As stated above, the vinyl chloride resin can contain comonomer units copolymerizable with vinyl chloride in a proportion of up to 15% by weight. Such comonomers include alkyl(meth)acrylates, vinyl carboxylates, allyl ethers, styrene, glycidyl(meth)acrylate, 3-hydroxypropyl methacrylate, 2-hydroxypropyl methacrylate, and 3-hydroxypropyl allyl ether.

The other binder components that can be used in combination with the polyurethanes (1) and (2) further include cellulosic resins, such as nitrocellulose, acrylic resins, polyvinyl acetal resins, polyvinyl butyral resins, epoxy resins, and phenoxy resins, and mixtures thereof. Where these binder resins are used in combination, their amount should be adjusted so that the total chlorine content of the binder may fall within the range specified in the invention. Usually, the polyurethane (1) or (2) is desirably used in a proportion of 50 to 100% by weight, preferably 70 to 100% by weight, still preferably 80 to 100% by weight, based on the total resin solids content of the binder. As long as the polyurethane (1) or (2) is used in an amount of at least 50% by weight, the binder exhibits satisfactory dispersing capability for powder.

It is preferred for the above-recited binder resins that are used in combination with the polyurethanes (1) and (2) to have a polar group, too. The kind and amount of the polar group that can be incorporated into these binder components are the same as for the polyurethanes (1) and (2). Where the vinyl chloride resin is used in combination with the polyurethane (1) or (2), the weight ratio of the polyurethane (1) or (2) to the polar group-containing vinyl chloride resin ranges preferably 85/15 to 100/0, still preferably 90/10 to 100/0, particularly preferably 95/5 to 100/0. Within that range, the magnetic recording medium has a limited chlorine content and is therefore environmentally friendly and free from the problems caused by hydrogen chloride gas generated, such as denaturation of the recording medium itself during long term storage and corrosion of a head.

The curing agent that serves as another binder component includes polyisocyanate curing agents and epoxy curing agents, with polyisocyanate curing agents being preferred. The polyisocyanate curing agents include the above-described organic diisocyanates that can be used as a constituent of the polyurethane resin of the present invention; reaction products between the organic diisocyanates and polyhydric alcohols (e.g., trimethylolpropane and glycerol), such as a reaction product between 3 mol of tolylene diisocyanate and 1 mol of trimethylolpropane (e.g., Desmodur L-75, available from Bayer), a reaction product between 3 mol of xylylene diisocyanate or hexamethylene diisocyanate and 1 mol of trimethylolpropane, and hexamethylene diisocyanate (3 mol) biuret (1 mol); and isocyanurate type polyisocyanates obtained by polymerization of diisocyanate compounds, such as a trimer, a pentamer and a hexamer of tolylene diisocyanate or hexamethylene diisocyanate. Polymeric MDI (4,4-diphenylmethane diisocyanate) is also included. The polyisocyanate compound in the magnetic layer is preferably used in an amount of 10 to 50% by weight, more preferably 20 to 40% by weight, based on the total binder.

Where the coating film is cured by electron beam irradiation, the coating composition can contain a compound having a reactive double bond, such as urethane acrylate. The total amount of the resin and the curing agent, i.e., the amount of the binder is preferably 15 to 40 parts by weight, still preferably 20 to 30 parts by weight, per 100 parts by weight of magnetic powder.

The form of the magnetic recording medium of the present invention is basically arbitrary and includes tapes, disks, sheets, and cards. The layer structure of the magnetic recording medium is also arbitrary as long as a magnetic layer is provided on a non-magnetic support. For example, the magnetic recording medium may have a single layer on the non-magnetic support, the single layer being a magnetic layer, or two layers on the non-magnetic support, the two layers being both a magnetic layer, or the upper layer being a magnetic layer with the lower one a non-recording layer. The term "magnetic layer" as used herein means a layer containing ferromagnetic powder capable of recording and reproducing information based on its magnetism. The term "non-recording layer" as used herein denotes a layer substantially free from ferromagnetic powder and is intended to include a non-magnetic layer and a soft magnetic layer. The "non-recording layer" usually contains non-magnetic powder or soft magnetic powder.

In a layer structure having a magnetic layer as a single layer on a support, the magnetic layer usually has a thickness of 0.05 to 0.15 $\mu$m, preferably 0.05 to 0.10 $\mu$m. In a layer structure having two magnetic layers provided on a support, the thickness of the upper magnetic layer is usually 0.05 to 0.15 $\mu$m, preferably 0.05 to 0.10 $\mu$m, and that of the lower magnetic layer is usually 0.8 to 3 $\mu$m.

In a layer structure having a magnetic layer as an upper layer and a non-magnetic layer as a lower layer, the thickness of the upper magnetic layer is usually 0.05 to 0.15 $\mu$m, preferably 0.05 to 0.10 $\mu$m, still preferably 0.05 to 0.08 $\mu$m, and that of the lower layer is usually 0.8 to 3 $\mu$m. In a layer structure having a magnetic layer as an upper layer and a soft magnetic layer as a lower layer, the thickness of the upper magnetic layer is usually 0.05 to 0.15 $\mu$m, preferably 0.05 to 0.10 $\mu$m, still preferably 0.05 to 0.08 $\mu$m, and that of the lower layer is usually 0.8 to 3 $\mu$m.

The magnetic recording medium of the invention is preferably a magnetic recording tape having a total thickness of 3.0 to 8.8 $\mu$m.

Where the magnetic recording medium has a multilayer structure, the polyurethane resin is preferably used in at least the uppermost layer, still preferably in every layer provided on the support.

The ferromagnetic metal powder that can be used in the invention includes single metals or alloys, such as Fe, Ni, Fe—Co, Fe—Ni, Co—Ni, and Co—Ni—Fe. Also included are alloys based on these ferromagnetic metals or alloys containing aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, silver, lead, phosphorus, lanthanum, cerium, praseodymium, neodymium, tellurium or bismuth in a proportion of not more than 20% by weight based on the ferromagnetic metal. The ferromagnetic metal powder may contain a small amount of water, a hydroxide or an oxide. Processes for producing ferromagnetic powders are well known in the art, by which the ferromagnetic powder for use in the present invention can be prepared.

Of the above-recited ferromagnetic metal powders preferred for use in the invention is one comprising Fe, 10 to 40 atom % of Co, 2 to 20 atom % of Al, and 1 to 15 atom % of Y.

The ferromagnetic metal powder usually has a crystallite size of 80 to 200 Angstrom, preferably 90 to 180 Angstrom, still preferably 100 to 170 Angstrom. The ferromagnetic metal powder usually has an average long axis length of 0.04 to 0.2 $\mu$m, preferably 0.04 to 0.15 $\mu$m, still preferably 0.04 to 0.1 $\mu$m. The ferromagnetic metal powder preferably has an average acicular ratio (long axis length to short axis length ratio) of 5 to 15, still preferably 6 to 12. A ferromagnetic powder whose average long axis length is smaller than 0.04 $\mu$m lacks thermal stability and undergoes deterioration of magnetic characteristics. A ferromagnetic powder whose average long axis length is greater than 0.2 $\mu$m causes increased noise, resulting in a reduced C/N ratio. The acicular ratio is represented in terms of a ratio of an average long axis length measured by transmission electron microscopy to a crystallite size measured by X-ray diffractometry.

The ferromagnetic metal powder preferably has a pH of 7 or greater. The ferromagnetic metal powder usually has a coercive force Hc of 119 to 199 kA/m, preferably 127 to 191 kA/m, still preferably 135 to 183 kA/m.

The ferromagnetic metal powder is not particularly limited in shape. Usually, needle-like particles, granular particles, cubic particles, spindle-shaped particles, tabular particles, and the like are used. Needle-like ferromagnetic metal powders are preferred.

The above-described resin component, curing agent, and ferromagnetic powder are usually kneaded and dispersed together with a solvent commonly employed in the art, such as methyl ethyl ketone, dioxane, cyclohexanone or ethyl acetate, to prepare a magnetic coating composition. Kneading and dispersing are carried out in a conventional manner. The magnetic coating composition can contain fillers and additives generally employed in the art, such as abrasives (e.g., α-$Al_2O_3$ and $Cr_2O_3$), antistatics (e.g., carbon black), lubricants (e.g., fatty acids, fatty acid esters, and silicone oils), and dispersants.

The lower non-magnetic layer or lower magnetic layer that can be provided in the magnetic recording medium having a multilayer structure will then be described.

The inorganic powder that can be used in the lower layer may be either magnetic or non-magnetic. The non-magnetic powder is selected from inorganic compounds, such as metal oxides, metal carbonates, metal sulfates, metal nitrides, metal carbides, and metal sulfides; and non-magnetic metals. Examples of the inorganic compounds include titanium oxide ($TiO_2$ or TiO), α-alumina (α-alumina content: 90 to 100%), β-alumina, γ-alumina, α-iron oxide, chromium oxide, zinc oxide, tin oxide, tungsten oxide, vanadium oxide, silicon carbide, cerium oxide, corundum, silicon nitride, titanium carbide, silicon dioxide, magnesium oxide, zirconium oxide, boron nitride, calcium carbonate, calcium sulfate, barium sulfate, molybdenum disulfide, goethite, aluminum hydroxide, and mixtures thereof. Preferred of them are titanium dioxide, zinc oxide, iron oxide, and barium sulfate. Titanium dioxide is the most preferred. The non-magnetic metals include Cu, Ti, Zn, and Al. The non-magnetic powders preferably have an average particle size of 0.005 to 2 μm. If desired, non-magnetic powders different in average particle size may be used in combination, or a single kind of a non-magnetic powder having a broadened size distribution may be used to produce the same effect. A still preferred average particle size of the non-magnetic powder is 0.01 to 0.2 μm. The non-magnetic powder preferably has a pH of 6 to 9. The non-magnetic powder has a specific surface area of 1 to 100 $m^2$/g, preferably 5 to 50 $m^2$/g, still preferably 7 to 40 $m^2$/g. The non-magnetic powder preferably has a crystallite size of 0.01 to 2 μm. The non-magnetic powder has a dibutyl phthalate (DBP) oil absorption of 5 to 100 ml/100 g, preferably 10 to 80 ml/100 g, still preferably 20 to 60 ml/100 g, and a specific gravity of 1 to 12, preferably 3 to 6. The particle shape may be any of needle-like, spherical, polygonal and tabular shapes.

The soft magnetic powder includes Fe powder, Ni, magnetite powder, Fe—Si, Fe—Al, Fe—Ni, Fe—Co, Fe—Co—Ni, Fe—Al—Co (Sendust), Mn—Zn ferrite, Ni—Zn ferrite, Mg—Zn ferrite, Mg—Mn ferrite, and those described in Chikazumi Soushin, Kyoujiseitai no butsuri (1st vol.) Jiki-tokusei to ohyo, shokabo (1984), 368–376.

The non-magnetic powder and the soft magnetic powder is preferably coated with $Al_2O_3$, $SiO_2$, $TiO_2$, $ZrO_2$, $SnO_2$, $Sb_2O_3$ or ZnO. Surface coating with $Al_2O_3$, $SiO_2$, $TiO_2$ or $ZrO_2$ is preferred for improving the dispersibility of the powder. $Al_2O_3$, $SiO_2$ or $ZrO_2$ is particularly preferred. These surface coating compounds can be used either individually or as a combination thereof. According to the purpose, a composite coating layer can be formed by co-precipitation or by a method comprising first applying alumina to the non-magnetic or soft magnetic particles and then treating with silica or vise versa. The surface coating layer may be porous for some purposes, but a homogeneous and dense layer is generally preferred.

Carbon black can be incorporated into the lower layer to reduce surface resistivity Rs as is well known in the art and also to obtain a desired micro Vickers hardness. Carbon blacks suitable for these purposes include furnace black for rubber, thermal black for rubber, carbon black for color, and acetylene black. The carbon black to be used in the lower layer usually has a specific surface area of 100 to 500 $m^2$/g, preferably 150 to 400 $m^2$/g, a DBP oil absorption of 20 to 400 ml/100 g, preferably 30 to 200 ml/100 g, an average particle size of 5 to 80 nm, preferably 10 to 50 nm, still preferably 10 to 40 nm. The carbon black preferably has a pH of 2 to 10, a water content of 0.1 to 10%, and a tap density of 0.1 to 1 g/ml. Examples of commercially available carbon black products that can be used in the invention include Black Pearls 2000, 1300, 1000, 900, 800, 880, and 700 and Vulcan XC-72 from Cabot Corp.; #3050B, #3150B, #3250B, #3750B, #3950B, #950, #650B, #970B, #850B, and MA-600 from Mitsubishi Chemical Corp.; Conductex SC and RAVEN 8800, 8000, 7000, 5750, 5250, 3500, 2100, 2000, 1800, 1500, 1255, and 1250 from Columbian Carbon; and Ketjen Black EC from Akzo Nobel Chemicals.

Magnetic powder can also be used as inorganic powder of the lower layer. The magnetic powder that can be used in the lower layer includes γ-$Fe_2O_3$, Co-doped γ-$Fe_2O_3$, α-Fe-based alloys, and $CrO_2$. The magnetic substance for use in the lower layer is chosen according to the purpose. The effects of the present invention are independent of the kind of the magnetic substance. As is known, the upper magnetic layer and the lower magnetic layer can have their performance varied according to the purpose. For instance it is desirable to design the lower magnetic layer to have lower coercivity (Hc) than the upper magnetic layer in order to improve long wavelength recording characteristics. It is effective for the same purpose to design the lower magnetic layer to have higher remanence (Br) than the upper magnetic layer. In addition to what has been described, known multilayer configurations are applicable to the magnetic recording medium of the invention to enjoy contemplated advantages.

Binders, solvents, lubricants, dispersants, additives, methods of dispersing, and other particulars that have been described with respect to the upper magnetic layer are applicable to the lower magnetic or non-magnetic layer. In connection with the amounts and the kinds of the binder, additives and dispersant, in particular, known techniques relating to a magnetic layer are applicable.

The magnetic coating composition prepared from the above-recited materials is applied to the non-magnetic support to form the magnetic layer.

The non-magnetic support which can be used in the invention include biaxially stretched polyethylene naphthalate, polyethylene terephthalate, polyamide, polyimide, polyamide-imide, aromatic polyamide, and polybenzoxidazole. Supports made of polyethylene naphthalate or aromatic polyamide are preferred. If desired, the support may be subjected to pretreatment, such as corona discharge treatment, plasma treatment, adhesion promoting treatment, and heat treatment. It is desirable for the non-magnetic support to have such high surface smoothness as has a center-line average roughness (Ra) of 0.1 to 20 nm, preferably 1 to 10 nm, with a cut-off length of 0.25 mm. It is also desirable for the support to be free from giant projections of 1 μm or greater.

The magnetic recording medium of the invention is typically produced by coating a running non-magnetic support with a coating composition by a wet coating technique to give a dry thickness falling within the above-recited range. A plurality of coating compositions, whether magnetic or non-magnetic, may be applied successively or simultaneously. Coating equipment includes an air doctor (air knife) coater, a blade coater, a rod coater, an extrusion coater, a squeegee coater, an impregnation coater, a reverse roll coater, a transfer roll coater, a gravure coater, a kiss roll coater, a cast coater, a spray coater, and a spin coater. For the details of coating techniques, reference can be made in Saishin Coating Gijyutsu, published by Sogo Gijyutsu Center, May 31, 1983.

The following coating methods and apparatus are recommended to make the magnetic recording medium having a multilayer structure.
(a) A method comprising applying a coating composition for lower layer by using a coating apparatus generally employed for a magnetic coating composition, such as a gravure coater, a roll coater, a blade coater or an extrusion coater, and then applying a coating composition for upper layer while the lower layer is wet by means of an extrusion coating apparatus disclosed in JP-B-1-46186 and JP-A-60-238179, which is of the type in which a support is pressed while coated.
(b) A method in which a lower layer and an upper layer are applied almost simultaneously through a single coating head disclosed in JP-A-63-88080, JP-A-2-17971, and JP-A-2-265672, the coating head having two slits through which the respective coating liquids pass.
(c) A method in which a lower layer and an upper layer are applied almost simultaneously by means of an extrusion coating apparatus disclosed in JP-A-2-174965, the apparatus being equipped with a back-up roll.

The magnetic recording medium may have a backcoating layer on the non-magnetic support on the side opposite to the magnetic layer side. The backcoating layer is provided by applying a coating composition having particulate components serving as an abrasive, an antistatic, etc. and a binder dispersed in an organic solvent to the non-magnetic support on the side opposite to the magnetic layer side. The particulate components include various inorganic pigments and carbon black. The binder includes nitrocellulose, phenoxy resins, vinyl chloride resins, and polyurethane. The binders can be used either individually or as a mixture thereof. Such a backcoating layer is particularly suited to magnetic recording tapes.

If needed, an adhesive layer maybe provided on the surface of the non-magnetic support on which the coating composition for the magnetic layer or the backcoating layer is applied.

The magnetic coating layer thus applied is treated in a magnetic field to orient the ferromagnetic particles and then dried. The dried magnetic layer is smoothened with super calendering rolls, etc., whereby voids generated by evaporation of the solvent are eliminated to improve the packing density of the ferromagnetic powder in the magnetic layer, which leads to high electromagnetic characteristics. Calendering rolls can be of heat-resistant plastics, such as epoxy resins, polyimide, polyamide, and polyamide-imide, or metals. Heat-resistant plastic rolls and metal rolls can be used in combination.

It is desirable for the magnetic recording medium to have such high surface smoothness as has a center-line average surface roughness (Ra) of 0.1 to 4 nm, preferably 1 to 3 nm, with a cut-off length of 0.25 mm. To obtain a smooth surface, it is effective to calender a magnetic layer formed by using a specifically selected binder resin as described above. Calendering is carried out at a calender roll temperature of 60 to 100° C., preferably 70 to 100° C., still preferably 80 to 100° C., under a pressure of 100 to 500 kg/cm, preferably 200 to 450 kg/cm, still preferably 300 to 400 kg/cm. The resulting magnetic recording medium is slit or cut to desired width or size with a slitter, etc.

EXAMPLES

The present invention will now be illustrated in greater detail with reference to Examples, but it should be understood that the present invention is not deemed to be limited thereto. Unless otherwise noted, all the parts are by weight.

Example 1

1) Synthesis of Polyurethane Resin A

In a container equipped with a reflux condenser and a stirrer and purged with nitrogen, 24 mol % of polyester polyol (a) described below, 26 mol % of 2-ethyl-1,6-hexanediol (chain extender), and 2 mol % of dimethyl sulfoisophthalate (DEIS) were dissolved in cyclohexanone at 60° C. in a nitrogen stream. The molecular weight was calculated from the hydroxyl value. To the solution was added 60 ppm of di-n-dibutyltin dilaurate as a catalyst and dissolved by stirring for 15 minutes. To the mixture was further added 48 mol % of 4,4'-diphenylmethane diisocyanate (MDI), and the mixture was heated at 90° C. for 6 hours to obtain a polyurethane solution. The resulting polyurethane resin A had a urethane group content of 3.1 mmol/g, a weight average molecular weight of 41,000, and a Tg of 84° C.

Polyester Polyol (a):

Adipic acid (Dibasic acid) 100 mol %/2-ethyl-2-butyl-1,6-hexanediol (alkyl-branched diol) 70 mol %/1,6-hexanediol (straight chain diol) 30 mol %; molecular weight=620

2) Preparation of Coating Compositions

| 2-1) Formulation of coating composition for upper magnetic layer | |
|---|---|
| Ferromagnetic metal powder | 100 parts |
| Fe/Co = 70/30; Hc: 2250 Oe (≈179 kA/m); $S_{BET}$: 70 m$^2$/g; crystallite size: 130 Å; surface coating compound: $Al_2O_3$ and $Y_2O_3$; long axis length: 0.06 μm; acicular ratio: 8; σs: 125 emu/g (A · m$^2$/kg) | |
| Vinyl chloride resin MR110 (from Zeon Corp.) | 10 parts |
| Polyurethane resin A | 6 parts |
| α-$Al_2O_3$ (average particle size: 0.15 μm) | 5 parts |
| Carbon black (average particle size: 80 nm) | 0.5 parts |
| Butyl stearate | 1 part |
| Stearic acid | 5 parts |
| Methyl ethyl ketone | 90 parts |
| Cyclohexanone | 30 parts |
| Toluene | 60 parts |
| Coating composition for lower non-magnetic layer: | |
| Non-magnetic powder (α-$Fe_2O_3$) | 80 parts |
| long axis length: 0.15 μm; $S_{BET}$: 52 m$^2$/g; pH: 8; tap density: 0.8; DBP oil absorption: 27 to 38 ml/100 g; surface coating compound: $Al_2O_3$ and $SiO_2$ | |
| Carbon black | 20 parts |
| average primary particle size: 16 nm; DBP oil absorption: 120 ml/100 g; pH: 8.0; $S_{BET}$: 250 m$^2$/g; volatile content: | |

-continued

| | |
|---|---|
| 1.5% | |
| Vinyl chloride copolymer MR104 (from Zeon Corp.) | 12 parts |
| Polyurethane resin A | 5 parts |
| α-Al$_2$O$_3$ (average particle size: 0.2 μm) | 1 part |
| Butyl stearate | 1 part |
| Stearic acid | 1 part |
| Methyl ethyl ketone | 100 parts |
| Cyclohexanone | 50 parts |
| Toluene | 50 parts |

The components shown in each of the above-described formulations were kneaded in an open kneader and dispersed in a sand mill. Five parts of polyisocyanate Coronate L (from Nippon Polyurethane Industry Co., Ltd.) was added to each of the resulting dispersions. Forty parts of a methyl ethyl ketone/cyclohexanone mixed solvent was further added thereto. The resulting mixtures were each filtered through a filter having an average pore size of 1 μm to prepare a coating composition for upper layer and a coating composition for lower layer.

3) Preparation of Magnetic Recording Tape

A 5.2 μm thick polyethylene naphthalate film having a center-line surface roughness (Ra) of 0.001 μm on the side to be coated with a magnetic layer was prepared. The coating composition for lower layer was applied to the support to a dry thickness of 1.5 μm. Immediately thereafter, the coating composition for upper layer was applied to a dry thickness of 0.06 μm. While the two coating layers were wet, the ferromagnetic powder was oriented with a cobalt magnet having a magnetic power of 500 T·m (5000 G) and a solenoid having a magnetic power of 400 T·m (4000 G). After drying, the coated film was calendered on 7-roll calender composed of metal rolls and epoxy resin rolls at 100° C. at a running speed of 200 m/min. A coating composition for backcoating layer was applied to the opposite side of the support to a dry thickness of 0.5 μm.

The resulting coated film was slit to a width of 6.35 mm to obtain a DVC video tape.

Example 2

A DVC video tape was prepared in the same manner as in Example 1, except for using 100 parts of the following ferromagnetic metal powder.
Ferromagnetic Metal Powder:
Fe/Co=70/30; Hc: 2300 Oe (183 kA/m); S$_{BET}$: 65 m$^2$/g; crystallite size: 120 Å; surface coating compound: Al$_2$O$_3$, SiO$_2$, and Y$_2$O$_3$; long axis length: 0.05 μm; acicular ratio: 7; σs: 110 emu/g (A·m$^2$/kg)

Example 3

A DVC video tape was prepared in the same manner as in Example 1, except for using 100 parts of the following ferromagnetic metal powder.
Ferromagnetic Metal Powder:
Fe/Co=70/30; Hc: 2200 Oe (175 kA/m); S$_{BET}$: 75 m$^2$/g; crystallite size: 120 Å; surface coating compound: Al$_2$O$_3$, SiO$_2$, and Y$_2$O$_3$; long axis length: 0.05 μm; acicular ratio: 6; σs: 100 emu/g (A·m$^2$/kg)

Comparative Example 1

A DVC video tape was prepared in the same manner as in Example 1, except for increasing the dry thickness of the upper magnetic layer from 0.06 μm to 0.10 μm.

Comparative Example 2

A DVC video tape was prepared in the same manner as in Example 1, except for decreasing the dry thickness of the upper magnetic layer from 0.06 μm to 0.04 μm.

Example 4

A DVC video tape was prepared in the same manner as in Example 1, except for using 100 parts of the following ferromagnetic metal powder.
Ferromagnetic Metal Powder:
Fe/Co=70/30; Hc: 2150 Oe (171 kA/m); S$_{BET}$: 95 m$^2$/g; crystallite size: 95 Å; surface coating compound: Al$_2$O$_3$ and Y$_2$O$_3$; long axis length: 0.04 μm; acicular ratio: 4; σs: 120 emu/g (A·m$^2$/kg)

Example 5

A DVC video tape was prepared in the same manner as in Example 1, except for using 100 parts of the following ferromagnetic metal powder.
Ferromagnetic Metal Powder:
Fe/Co=70/30; Hc: 2150 Oe (171 kA/m); S$_{BET}$: 70 m$^2$/g; crystallite size: 110 Å; surface coating compound: Al$_2$O$_3$ and Y$_2$O$_3$; long axis length: 0.08 μm; acicular ratio: 7; σs: 80 emu/g (A·m$^2$/kg)

Comparative Example 3

A DVC video tape was prepared in the same manner as in Example 1, except for replacing polyurethane resin A used in the upper and lower layers with polyurethane resin B described below.
Polyurethane Resin B:
Neopentyl glycol/caprolactone polyol/MDI=0.9/2.6/1; —SO$_3$Na content: 1×10$^{-4}$ eq/g The characteristics of the magnetic recording tapes obtained in Examples and Comparative Examples were determined as follows. The results obtained are shown in Table 1.

(1) 1/2Tb Output

Camcorder DJ-1 (supplied by Matsushita Electric Industrial Co., Ltd.) was altered to have a 1/2Tb frequency (21 MHz) as a Tb:BIT interval. The signal output at 1/2Tb frequency (21 MHz) was measured. The recording current was the preset value of the deck. The output of reference tape MTR 1221 for DVC was taken as 0 dB. Usually, −1.0 dB or more is practicable, and −0.5 dB or more is desirable.

(2) 1/90Tb Output

Camcorder DJ-1 was altered to have a 1/90Tb frequency (464 kHz) as a Tb:BIT interval, and the signal output at 1/9ØTb frequency (464 kHz) was measured. The recording current was the preset value of the deck. The output of reference tape MTR 1221 for DVC was taken as 0 dB. Usually, −1.0 dB or more is practicable, and −0.5 dB or more is desirable.

(3) 1/75Tb Signal O/W (overwrite performance)

Signals at a 1/75Tb frequency were recorded on the altered camcorder DJ-1. The recorded signals were reproduced, and the output was measured. Data signals were then overwritten. The 1/75Tb signals remaining unerased were measured with a spectrum analyzer. The difference between the 1/75Tb signal outputs before and after the data signal overwrite was taken as an O/W erasability. The same measurement was conducted using reference tape MTR 1221, and the difference in O/W erasability between the tape under test and the reference tape was taken as 1/75Tb signal O/W of the tape under test. Usually, a 1/75Tb signal O/W of +1.0 dB or less is practicable, and a 1/75Tb signal O/W of +0.5 dB or less is desirable.

(4) Ra:

The center line average surface roughness. (Ra) was measured with a digital optical profilometer (available from WYKO) at a cut-off length of 0.25 mm in accordance with the light interference method.

(5) Π (Product of Coercive Force Hc in the In-plane, Longitudinal Direction and Magnetic Flux Øm)

Magnetic characteristics were measured in the direction parallel to the orientation direction in an outer magnetic field of 796 kA/m (10 kOe) using a sample vibration magnetometer (supplied by Toei Kogyo K.K.).

TABLE 1

|  | Ex. 1 | Ex. 2 | Ex. 3 | Comp. Ex. 1 | Comp. Ex. 2 | Ex. 4 | Ex. 5 | Comp. Ex. 3 |
|---|---|---|---|---|---|---|---|---|
| HC (kA/m) | 183 | 187 | 179 | 181 | 184 | 171 | 171 | 179 |
| Øm (T μm) | 3.0 | 4.0 | 2.5 | 5.0 | 2.0 | 3.0 | 3.0 | 3.0 |
| Π | 549 | 748 | 448 | 904 | 368 | 514 | 514 | 537 |
| Ra (nm) | 1.8 | 0.2 | 1.9 | 1.7 | 2.1 | 2.5 | 1.8 | 2.5 |
| ½ Tb Output (dB) | 0.0 | −0.2 | −0.5 | −0.9 | 0.2 | −1.0 | −0.8 | −1.5 |
| 1/90 Tb Output (dB) | −0.5 | 0.0 | −1.0 | 1.2 | −1.5 | 0.5 | −1.0 | 0.5 |
| 1/75 Tb O/W | +0.2 | +0.5 | 0.0 | +2.5 | −1.0 | +1.0 | +1.0 | +1.5 |

The following observations can be drawn from the results in Table 1.

Examples 1 and 2 show favorable results, in which the output and overwrite performance are well balanced.

In Example 3, since the product Π is close to the lower limit, the overwrite performance is graded medium.

In Comparative Example 1, the product Π is greater than the upper limit so that the overwrite performance is poor.

In Comparative Example 1, the product Π is smaller than the lower limit, which results in poor 1/90Tb output.

In Example 4, the $S_{BET}$ of the magnetic powder exceeds the preferred range, resulting in reduced surface properties of the magnetic layer. As a result, the 1/2Tb output and overwrite performance are on medium levels.

In Example 5, since the σs of the magnetic layer is lower than the desired range, the output and overwrite performance are on medium levels.

In Comparative Example 3, use of polyurethane resin B in place of polyurethane A as a binder resin results in poor surface properties, leading to poor 1/2Tb output.

The magnetic layer of the magnetic recording medium according to the present invention has the product Π of coercive force Hc in the in-plane longitudinal direction and magnetic flux Øm (T μm) ranging from 400 to 800. By this control, the magnetic recording medium of the invention is excellent in overwrite and read output.

This application is based on Japanese Patent application JP 2003-162402, filed Jun. 6, 2003, the entire content of which is hereby incorporated by reference, the same as if set forth at length.

What is claimed is:

1. A magnetic recording medium comprising a non-magnetic support and a magnetic layer containing a binder and a ferromagnetic metal powder dispersed in the binder, wherein
    the binder contains a polyurethane resin obtained from a polyester polyol, a chain extender, and an organic diisocyanate, and
    the magnetic layer has a product Π of coercive force Hc (kA/m) in an in-plane, longitudinal direction and magnetic flux Øm (T μm) in a range of from 400 to 800.

2. The magnetic recording medium according to claim 1, wherein the polyurethane is (1) one in which the polyester polyol component contains an aliphatic dibasic acid component and 70 mol % or more, based on a total diol component content, of an alkyl-branched diol component having no cyclic structure and having an alkyl branch containing more than one carbon atoms or (2) one in which the polyester polyol component contains an aliphatic dibasic acid component, 70 mol % or more, based on a total diol component content, of an aliphatic alkyl-branched diol component having at least one alkyl branch containing more than one carbon atoms in total per molecule, and, as a chain extender, an aliphatic alkyl-branched diol having at least one alkyl branch containing more than two carbon atoms in total per molecule.

3. The magnetic recording medium according to claim 1, wherein the ferromagnetic metal powder has a BET specific surface area of 50 to 90 m²/g and a saturation magnetization of 90 to 130 A·m²/kg.

4. The magnetic recording medium according to claim 1, wherein the product Π is from 480 to 720.

5. The magnetic recording medium according to claim 1, wherein the product Π is from 480 to 640.

6. The magnetic recording medium according to claim 1, wherein the ferromagnetic metal powder has a BET specific surface area of 60 to 80 m²/g.

7. The magnetic recording medium according to claim 1, wherein the ferromagnetic metal powder has a saturation magnetization of 100 to 120 A·m²/kg.

8. The magnetic recording medium according to claim 1, wherein the ferromagnetic metal powder has a saturation magnetization of 100 to 110 A·m²/kg.

9. The magnetic recording medium according to claim 1, wherein the polyurethane has a weight average molecular weight of 30,000 to 70,000.

10. The magnetic recording medium according to claim 1, wherein the polyurethane has a weight average molecular weight of 40,000 to 60,000.

11. The magnetic recording medium according to claim 1, wherein the polyurethane has a glass transition temperature of 500 to 150° C.

12. The magnetic recording medium according to claim 1, wherein the polyurethane has a glass transition temperature of 700 to 120° C.

13. The magnetic recording medium according to claim 1, wherein the polyurethane has a glass transition temperature of 80° to 100° C.

14. The magnetic recording medium according to claim 1, wherein the polyurethane has a polar group.

15. The magnetic recording medium according to claim 14, wherein the polar group is selected from —SO₃M, —OSO₃M, —COOM, —P=O(OM)₂, —O—P=O(OM)₂, —NR₂, —N⁺R₂R'COO⁻, wherein M represents a hydrogen atom, an alkali metal atom or an ammonium group; and R and R' each independently represent an alkyl group having 1 to 12 carbon atoms.

* * * * *